US009455618B2

(12) United States Patent
Son et al.

(10) Patent No.: US 9,455,618 B2
(45) Date of Patent: Sep. 27, 2016

(54) METHOD FOR CONTROLLING MULTILEVEL CONVERTER

(71) Applicants: LSIS CO., LTD., Anyang-si, Gyeonggi-do (KR); Industry-Academic Cooperation Foundation, Yonsei University, Seoul (KR)

(72) Inventors: Gum Tae Son, Seoul (KR); Kyeon Hur, Seoul (KR); Jung Wook Park, Seoul (KR); Hee Jin Lee, Seoul (KR); Tae Sik Nam, Seoul (KR); Yong Ho Chung, Ansan-si (KR); Seung Taek Baek, Anyang-si (KR); Wook Hwa Lee, Incheon-si (KR)

(73) Assignees: LSIS CO., LTD., Anyang-si (KR); Industry-Academic Cooperation Foundation, Yonsei University, Seoul (KR)

( * ) Notice: Subject to any disclaimer, the term of this patent is extended or adjusted under 35 U.S.C. 154(b) by 177 days.

(21) Appl. No.: 14/284,906

(22) Filed: May 22, 2014

(65) Prior Publication Data
US 2014/0354248 A1  Dec. 4, 2014

(30) Foreign Application Priority Data

May 28, 2013 (KR) .................. 10-2013-0060102

(51) Int. Cl.
*H02M 7/483* (2007.01)
*H02M 1/08* (2006.01)
(Continued)

(52) U.S. Cl.
CPC ................ *H02M 1/08* (2013.01); *H02M 7/49* (2013.01); *H02M 2001/0003* (2013.01); *H02M 2007/4835* (2013.01)

(58) Field of Classification Search
CPC ............................................. H02M 2007/4835
See application file for complete search history.

(56) References Cited

U.S. PATENT DOCUMENTS

| 7,230,837 B1 | 6/2007 | Huang et al. |
| 2012/0068555 A1 | 3/2012 | Aiello et al. |
| 2015/0162848 A1* | 6/2015 | Harnefors ............. H02J 3/1814 363/78 |

FOREIGN PATENT DOCUMENTS

| CN | 101951162 A | 1/2011 |
| DE | 10-2011-108920 | 1/2013 |

(Continued)

OTHER PUBLICATIONS

Darus, Rosheila, A Modified Voltage Balancing Sorting Algorithm for the Modular Multilevel Converter: Evaluation for Staircase and Phase-Disposition PWM, Applied Power Electronics Conference and Exposition APEC, Mar. 2014, pp. 255-260.*

Wang, Lin, A Novel Votage Balancing Control Strategy for MMC, International Conference on Electrical Machines and Systems ICES, Oct. 2013, pp. 1804-1807.*

(Continued)

*Primary Examiner* — Harry Behm
(74) *Attorney, Agent, or Firm* — Lee, Hong, Degerman, Kang & Waimey; Jonathan Kang; Harry Lee

(57) ABSTRACT

The present disclosure provides a method for controlling a multilevel converter, the method including, detecting modulation state values and current directions of sub-modules, and designating, by one sub-module, an average number of switching for each period of an output waveform, wherein the step of designating the average number of switching includes, grouping the sub-modules according to being in ON state or in OFF state, comparing the number of sub-modules in previous ON state and the number of sub-modules in OFF state to obtain a difference therebetween, and changing a state as much as the difference, comparing a sub-module of ON state in charged state and in discharged state with a sub-module of OFF state, and changing the compared states of sub-modules of ON state and OFF state.

6 Claims, 3 Drawing Sheets

(51) Int. Cl.
 *H02M 7/49* (2007.01)
 *H02M 1/00* (2006.01)

(56) References Cited

FOREIGN PATENT DOCUMENTS

| JP | 62-210867 | 9/1987 |
| JP | 2001-061283 | 3/2001 |
| JP | 2010-517496 | 5/2010 |
| JP | 2012-147559 | 8/2012 |

OTHER PUBLICATIONS

European Patent Office Application Serial No. 14169817.5, Search Report dated Mar. 31, 2015, 6 pages.
Japan Patent Office Application Serial No. 2014-108975, Office Action dated Mar. 31, 2015, 4 pages.
State Intellectual Property Office of the People's Republic of China Application Serial No. 201410231984.4, Office Action dated Apr. 25, 2016, 6 pages.

\* cited by examiner

METHOD FOR CONTROLLING MULTILEVEL CONVERTER

CROSS-REFERENCE TO RELATED APPLICATIONS

Pursuant to 35 U.S.C.§119(a), this application claims the benefit of earlier filing date and right of priority to Korean Patent Application No. 10-2013-0060102, filed on May 28, 2013, the contents of which are all hereby incorporated by reference herein in its entirety.

BACKGROUND OF THE DISCLOSURE

Field

The teachings in accordance with the exemplary embodiments of this present disclosure generally relate to a method for controlling a converter, and more particularly to a method for controlling a multilevel converter.

A gate switching scheme in consideration of voltage balance is used in a multilevel converter system in the related art. In the voltage balancing in the related art, information inputted during modulation and capacitor voltage information outputted from every sub-module inside an arm are arranged in order of a voltage level. A sub-module is selected using information processed in this way. Specifically, a mechanism is employed, in which a sub-module having the highest voltage or the lowest voltage is selected according to current information of the corresponding arm.

According to the voltage balancing in the related art, it is first determined how many sub-modules output an ON signal, and it is then determined which sub-module in one arm is to be in ON state. At this time, a sorting operation of comparing voltage values for the respective sub-modules with each other and arranging the compared voltage values is performed in order to equally distribute the voltages of the sub-modules. Since the sub-modules in ON state are charged and discharged according to an arm current direction, a sub-module is selected according to charging and discharging, and the charging or discharging is realized in the selected sub-module.

SUMMARY OF THE DISCLOSURE

The present disclosure is to provide a method for controlling a multilevel converter configured to increase efficiency.

In one general aspect of the present disclosure, there is provided a method for controlling a multilevel converter, the method comprising:
  detecting modulation state values and current directions of sub-modules; and
  designating, by one sub-module, an average number of switching for each period of an output waveform, wherein
  the step of designating the average number of switching includes:
  grouping the sub-modules according to being in ON state or in OFF state;
  comparing the number of sub-modules in previous ON state and the number of sub-modules in OFF state to obtain a difference therebetween, and changing a state as much as the difference;
  comparing a sub-module of ON state having a high voltage as much as a predetermined value in charged state with a sub-module of OFF state having a low voltage value, and changing the compared states of sub-modules of ON state and OFF state, when the values of sub-modules of ON state are higher; and
  comparing a sub-module of ON state having a low voltage as much as a predetermined value in discharged state with a sub-module of OFF state having a high voltage value, and changing the compared states of sub-modules of ON state and OFF state, when the values of sub-modules of OFF state are higher.

Preferably, but not necessarily, the step of comparing the number of sub-modules in previous ON state and the number of sub-modules in OFF state to obtain a difference therebetween, and changing a state as much as the difference may include changing the sub-modules in OFF state to the sub-modules in ON state as much as the difference, when the number of sub-modules in previous ON state is greater than the number of sub-modules in OFF state.

Preferably, but not necessarily, the step of comparing the number of sub-modules in previous ON state and the number of sub-modules in OFF state to obtain a difference therebetween, and changing a state as much as the difference may include changing the sub-modules in ON state to the sub-modules in OFF state as much as the difference, when the number of sub-modules in previous ON state is smaller than the number of sub-modules in OFF state.

Preferably, but not necessarily, the step of comparing the number of sub-modules in previous ON state and the number of sub-modules in OFF state to obtain a difference therebetween, and changing a state as much as the difference may include changing the sub-modules in ON state to the sub-modules in OFF state as much as the difference, when the number of sub-modules in previous ON state is smaller than the number of sub-modules in OFF state.

Preferably, but not necessarily, the step of changing the sub-modules in OFF state to the sub-modules in ON state may include changing the sub-modules of ON state from sub-modules having the lowest voltage during charging in response to current direction, and changing the sub-modules of ON state from sub-modules having the highest voltage during discharging in response to the current direction.

Preferably, but not necessarily, the step of changing the sub-modules in OFF state to the sub-modules in ON state may include changing the sub-modules to ON state from sub-modules having the high voltage during charging in response to current direction, and changing the sub-modules to OFF state from sub-modules having the lowest voltage during discharging in response to the current direction.

Preferably, but not necessarily, the predetermined value in the charged state and the predetermined value in the discharged state may be of same value.

Advantageous Effects of the Disclosure

The method for controlling a multilevel converter according to an exemplary embodiment of the present disclosure has an advantageous effect in that switching is not concentratively performed on one sub-module but evenly performed to allow optimally using a switching device and a capacitor, whereby a product unit price can be lowered through optical design of multilevel convereter.

Another advantageous effect is that switching is evenly performed on each sub-module to allow evenly increasing the number of switchings, instead of simply increasing the number of switchings on the average, whereby life of multilevel converter can be expectedly prolonged.

Still another advantageous effect is that code of alignment part in the digital process for control can be simply replaced by the currently proposed method according to the present disclosure to dispense with additional much expenses involving installation of separate hardware and changes in shapes.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

The present disclosure relates to a switching scheme in consideration of voltage balance used in a multilevel converter, particularly to a method for reducing a computational effort required to a scheme for one period of fundamental frequency. The present disclosure may be applicable to all power electronic devices using multilevel converters, and electronic devices using the power electronic devices. Particularly, the present disclosure is more useful to large capacity power devices using a plurality of sub-modules. The present disclosure may simply be one of standards in selecting detailed capacity of power devices through changes in power balancing scheme of multilevel converter. That is, an arbitrary adjustment in the number of switchings of sub-modules in one period can selectively reduce the capacity of capacitance used for each sub-module.

Figure 1:
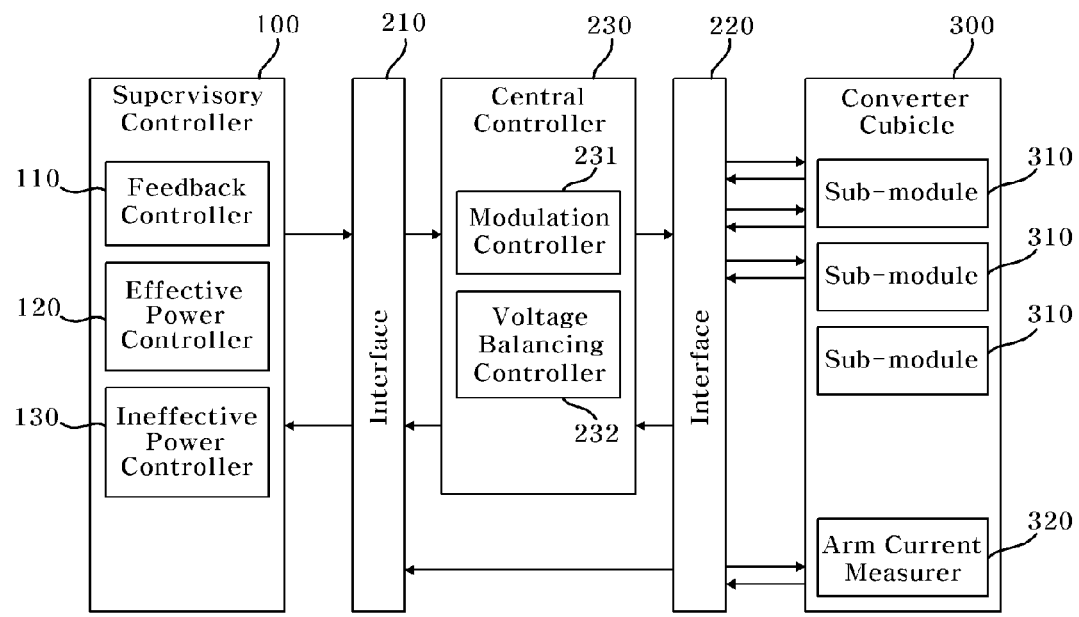
FIG. 1 is a block diagram illustrating a method for controlling a multilevel converter according to the present disclosure.

FIG. 1 is a block diagram illustrating a method for controlling a multilevel converter according to the present disclosure.

Referring to FIG. 1, a supervisory controller (100) generates a reference signal, and a central controller (230) controls a sub-module to allow each sub-module to apply a gate signal. A bi-directional communication of gate signal is generated by a converter cubicle (300), which is a substantial set of each sub-module. The supervisory controller (100) includes a feedback controller (110), an effective power controller (120) and an ineffective power controller (130). The central controller (230) includes a modulation controller (231) and a voltage balancing controller (232). The converter cubicle (300) includes a plurality of sub-modules (310) and an arm current measurer (320).

Figure 2:
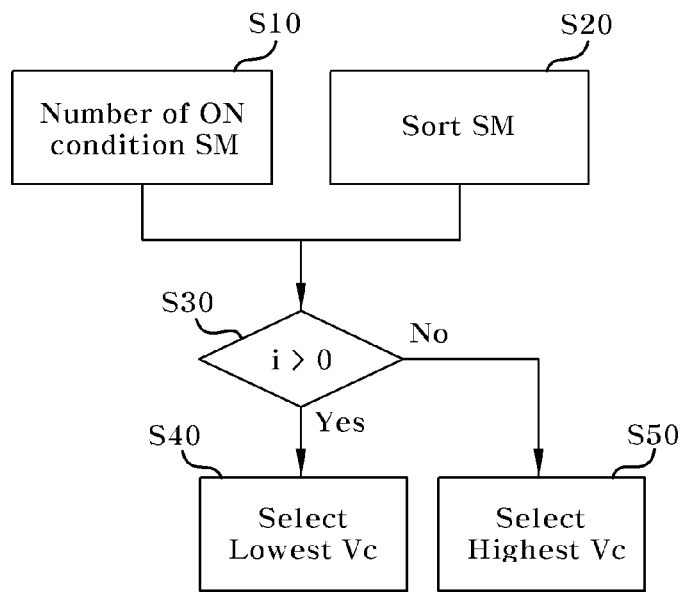
FIGS. 2 and 3 are block diagrams illustrating a method for controlling a voltage balancing part illustrated in FIG. 1.

FIG. 2, provided to explain the present disclosure, is a flowchart illustrating a method for controlling a multilevel converter, and more particularly a flow chart of voltage balancing part Referring to FIG. 2, the method for controlling voltage balancing includes determining the number of sub-modules satisfying an ON condition (S10), sorting the sub-module in response to a voltage value (S20), selecting a smallest voltage (S40) when a current value is positive (S30-YES), and selecting a greatest voltage (S50) when a current value is negative (S30-NO). According to the abovementioned disclosure, a greatest time is consumed in the step (S20) sorting the sub-module in response to a voltage value, In case of module-based multilevel converter used for a large capacity of power device, one arm is formed with 150~200 sub-modules. A digital processing step is divided into four parts which include a process of converting a voltage value of sub-module into a digital value, a process of aligning the converted values of sub-modules, a process of selecting a sub-module in response to a current direction, and a process of applying to a gate signal of selected sub-module.

The central controller (230) generates a gate signal using voltage values of each capacitance held by the sub-modules (310 . . . ) where the gate signal is generally determined by arithmetic comparison (sorting algorithm) of voltage values of each capacitor at the sub-modules (310 . . . ). Particularly, determination (S30) is made as to whether to select sub-modules (310 . . . ) having the smallest capacitor voltage or to select sub-modules having the greatest capacitor voltage in response to current direction by using the signal from the modulation controller (231) and information of value sorted through the arithmetic comparison (sorting algorithm) of each sub-module.

Figure 3:
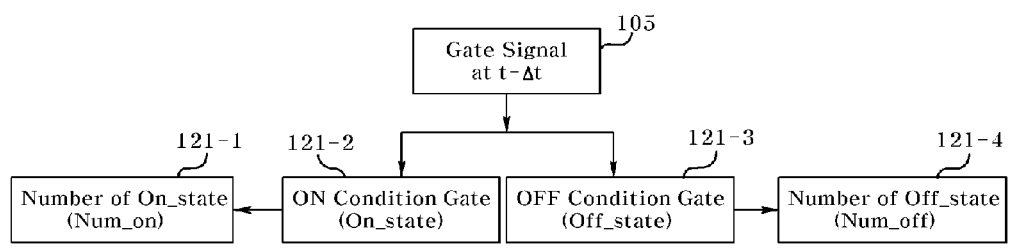

FIG. 3, provided to explain the present disclosure, is a flowchart illustrating a method for controlling a multilevel converter, and more particularly a flow chart of voltage balancing part.

First, a gate signal at a time (t-Δt) is determined (S105), whereby a state right before the sub-module can be known. That is, An ON/OFF states right before the sub-module can be known. When the ON/OFF states of each sub-module are known, the sub-modules are divided to an ON state or OFF state of sub-modules (121-2, 121-3), whereby control of sub-modules can be swiftly implemented.

Thereafter, a total sum of the number of sub-modules, each divided to ON state and OFF state, is obtained (121-1, 121-4). That is, the number of sub-modules in ON state and the number of sub-modules in OFF state are determined using previous gate signal (105). Successfully, a sub-module having the highest voltage and a sub-module having the lowest voltage are determined from the sub-modules of ON state. In like manner, a sub-module having the highest voltage and a sub-module having the lowest voltage are determined from the sub-modules of OFF state.

When a voltage balancing technique for one switching of a sub-module for each period is used, a set of sub-modules corresponding to ON-state and a set of sub-modules corresponding to ON-state are divided using the gate signal at a past sampling time. The divided sets may be calculated by a sum of sub-modules corresponding to ON-state and a sum of sub-modules corresponding to OFF-state.

The voltage balancing technique according to the method for controlling the multilevel converter illustrated in FIGS. 1, 2 and 3 shows steps directly generating a gate signal of each sub-module. The voltage balancing technique is one of the most important control parts in the central controller, which may be realized by the sorting algorithm. However, the problem is that there occur too many switchings in one period according to the sorting algorithm. In order to solve the problems, and as illustrated in FIG. 3, and in order to maximize the merit of multilevel converter, a sub-module in which a current switching occurs may be determined by dividing ON-state set and OFF-state set so that one switching occur for each period.

In the method for controlling the multilevel converter illustrated in FIGS. 1 and 2, the voltage balancing technique using only the sorting algorithm is based only on a capacitor voltage of each sub-module. Thus, the problem is that the number of switchings in one sub-module for each period cannot be adjusted to generate a switching loss caused from each sub-module due to there being too many numbers and to disable to use the advantages of multilevel converter. That is, 20 switchings may occur for each period based on one sub-module, which may create too much heat loss and affect the life of switching device.

The method of allowing occurring one switching for each period based on one sub-module is the determination method dividing to ON-state group and OFF-state group as illustrated in FIG. 3. However, another problem occurs that a high capacitance is required because the switching of sub-module occurs once and charging and discharging of capacitor voltage in sub-module are generated only once. Furthermore, the switching device may not be optimally used due to less switching loss.

The present disclosure relates to switching technique that is realized through voltage balancing of multilevel converter. Just like using sorting algorithm in the switching balancing technique, determination of gate signal is generally made through direct comparison method of voltage in sub-module. However, capacity of capacitor in a sub-module can be determined by sorting method, where a manufacturing standard of multilevel converter can be easily made when one sub-module is determined of switching for each period. The present disclosure is to provide algorithm for determining the number of switchings performed by one sub-module for each period, whereby a system can be designed to cater to requirement of manufacturer.

Figure 4:
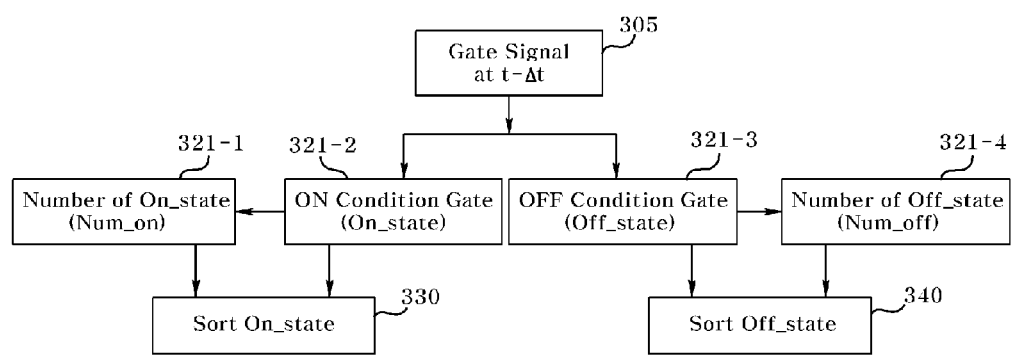
FIGS. 4 and 5 are block diagrams illustrating a method for controlling a multilevel converter according to an exemplary embodiment of the present disclosure.
Figure 5:
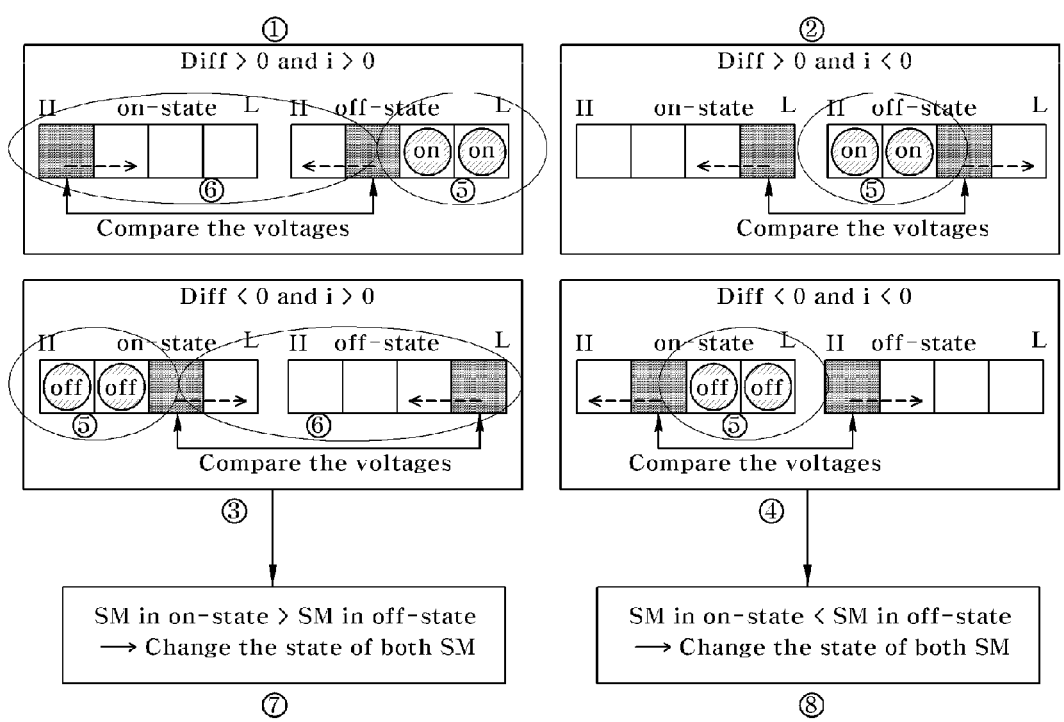

FIGS. 4 and 5 are block diagrams illustrating a method for controlling a multilevel converter according to an exemplary embodiment of the present disclosure, where FIG. 4 illustrates initialization of a multilevel converter and FIG. 5 illustrates how to control in various cases that may be generated during operation of a multilevel converter.

Referring to FIG. 4, the method for controlling a multilevel converter according to an exemplary embodiment of the present disclosure is different from sorting of all sub-modules in an arm module through respective sorting in ON-state and OFF-state. The method is divided into a step (S330) of sorting a group corresponding to On-state and a step (S340) of sorting a group corresponding to OFF-state.

First, a gate signal at a time (t-Δt) is determined (305), whereby a state right before the sub-module can be known. That is, an ON/OFF states right before the sub-module can be known. When the ON/OFF states of each sub-module are known, the sub-modules are divided to an ON state or OFF state of sub-modules (321-2, 321-3), whereby control of sub-modules can be swiftly implemented.

Thereafter, a total sum of the number of sub-modules, each divided to ON state and OFF state, is obtained (321-1, 321-4). That is, the number of sub-modules in ON state and the number of sub-modules in OFF state are determined using erstwhile gate signal (105). Successfully, sub-modules in ON-state are sorted, and sub-modules in OFF-state are sorted (S330, S340).

Continuously referring to FIG. 5, the method for controlling a multilevel converter according to an exemplary embodiment of the present disclosure may be largely divided into four types based on current modulation state value (Diff) and current direction (i). The modulation state value (Diff) may be obtained by the following manner.

First, the number of sub-modules {ON condition gate at t(n)} to have ON-state is obtained, and once the number of sub-modules to have ON-state is obtained, the calculated number of sub-modules having erstwhile ON-state is deducted therefrom. A state value (diff) becomes a base for determining how many states of sub-modules are to be controlled, and if the number of sub-modules to have ON-state is greater than that of erstwhile ON-state, the state value (diff) is positive, and if the number of sub-modules to have ON-state is smaller than that of erstwhile ON-state, the state value (diff) is negative. The current direction (i) is positive when in charged state, and is negative when in discharged state.

A first case is where the number of ON-state sub-modules has increased and the sub-modules are in charged state (①), and a second case is where the number of ON-state sub-modules has increased but with sub-modules being in discharged state (②), a third case is where the number of ON-state sub-modules has decreased and the sub-modules are in charged state (③), and a fourth case is where the number of ON-state sub-modules has decreased but with sub-modules being in discharged state (④).

Only one of four states may be selected during operation of the multilevel converter. That is, one of four states may be selected depending on two variables of state value and current direction (Diff, i), where a step of turning on or turning off the sub-module at a current state is indicated as '⑤', and a subsequent step of forcibly changing the state of sub-modules in ON-state and OFF off-state groups is indicated as '⑥'.

As illustrated in FIG. 5, if the sub-modules are in charged state, and if sub-modules of ON-state group is greater in terms of voltage than those of OFF-state group, states of two sub-modules are changed (⑦). If the sub-modules are in discharged state, and if sub-modules of ON-state group is smaller in terms of voltage than those of OFF-state group, states of two sub-modules are changed (⑧).

First, the multilevel converter according to an exemplary embodiment of the present disclosure stores a current gate state by dividing into "ON-state" and "OFF-state", not by a method of sorting all the sub-modules inside one arm, through which a calculation amount can be reduced, and the number of switchings of sub-modules for each period can be limited, not because of data processing of a total number of sub-modules, but because of data processing of dividing to two states of groups.

In a case when the number of sub-modules in ON-state is greater than the past as a result of modulation, that is, in a case when the state value is positive (Diff>0), turn-on is made as much as an absolute value (Diff) from OFF-state group. At this time, the "turn-on" is made from a sub-module having the lowest voltage during charging in response to current direction, and from a sub-module having the highest voltage during discharging. If the state value is negative (Diff<0), the sub-module of ON-state group is turned off, where the turn-off is made from a sub-module having the highest voltage during charging, and from a sub-module having the lowest voltage during discharging. This much is an algorithm where one switching for each period can occur for one sub-module.

A value to be changed as much as desired by manufactures may be determined to enhance the switching. That is, the manufacture determines a value of how many more times of switchings one sub-module can generate for one period. If a current state is in a charging state, a comparison is made between a sub-module having a high voltage value of ON-state group as many as the number to be changed and a sub-module having a low voltage value of OFF-state group, and if the ON-state group is higher than the OFF-state group, the states of two sub-modules are changed, and if negative, a current state is maintained.

Furthermore, if a current state is in a discharging state, a comparison is made between a sub-module having a low voltage value of ON-state group and a sub-module having a high voltage value of OFF-state group, and if the OFF-state group is higher than the ON-state group, the states of two sub-modules between two groups are changed, and if negative, a current state is maintained.

As apparent from the foregoing, the number of switchings of sub-modules for each period can be adjusted, when the multilevel converter is controller. The number of switchings is an important factor when capacity of a capacitor inside the sub-module is determined. Although the capacity of a capacitor may be decreased as the switching generated for each period becomes higher, an amount of loss at each switching device (e.g., IGBT) may be increased such that it is important to adequately determine the number of switchings.

The method for controlling a multilevel converter according to the exemplary embodiment of the present disclosure is advantageous in that switchings are not concentratively generated, but evenly generated on one sub-module to enable an optical use of switching device and capacitor, whereby a product unit price can be reduced through optimal design of multilevel converter.

The method for controlling a multilevel converter according to the exemplary embodiment of the present disclosure is also advantageous in that switching of each sub-module is evenly realized not to simply increase the number of switchings but to allow the number of switchings to be evenly changed, whereby an expected effect of prolonging the life of multilevel converter can accomplished.

The method for controlling a multilevel converter according to the exemplary embodiment of the present disclosure is further advantageous in that no additional costs are required for separate hardware change and/or shape change, because codes of sorted portions of digital processor for control can be simply replaced by the method proposed by the present disclosure.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A method for controlling a multilevel converter, the method comprising:
   detecting states (ON/OFF) and directions of current of sub-modules; and
   controlling output voltage of the multilevel converter by turning-on or turning-off the sub-modules,
   wherein the controlling the output voltage of the multilevel converter includes:
      grouping the sub-modules into a first group including sub-modules that are in an ON state and a second group including sub-modules that are in an OFF state, sorting the sub-modules according to their capacitor voltages; and
      turning-on or turning-off the sub-modules by determining a difference between a number of sub-modules to be turned-on and a number of sub-modules that was previously in the ON state.

2. The method of claim 1, further comprising:
   forcibly changing a state of both a sub-module in the ON state and a sub-module in the OFF state if a voltage of the sub-module in the ON state is greater than a voltage of the sub-module in the OFF state during a charging period, or if a voltage of the sub-module in the ON state is less than a voltage of the sub-module in the OFF state during a discharging period.

3. The method of claim 2, further comprising:
   forcibly changing a state of a plurality of sub-modules in the ON state and a plurality of sub-modules in the OFF state.

4. The method of claim 1, wherein the turning-on or turning-off the sub-modules is based on the detected directions of current and includes:
   turning-on a sub-module having a lowest voltage during the charging period; and
   turning-on a sub-module having a highest voltage during the discharging period.

5. The method of claim 1, wherein the turning-on or turning-off the sub-modules is based on the detected directions of current and includes:
   turning-off a sub-module having a highest voltage during the charging period; and
   turning-off a sub-module having a lowest voltage during the discharging period.

6. The method of claim 1, wherein the sub-modules are sorted according to a voltage of each of the sub-modules for each of the first and second groups.

* * * * *